(12) United States Patent
Fatih

(10) Patent No.: US 12,043,069 B2
(45) Date of Patent: Jul. 23, 2024

(54) MOTOR VEHICLE

(71) Applicant: Selahattin Fatih, Herford (DE)

(72) Inventor: Selahattin Fatih, Herford (DE)

( * ) Notice: Subject to any disclaimer, the term of this patent is extended or adjusted under 35 U.S.C. 154(b) by 323 days.

(21) Appl. No.: 17/434,279

(22) PCT Filed: Dec. 17, 2020

(86) PCT No.: PCT/EP2020/086774
§ 371 (c)(1),
(2) Date: Aug. 26, 2021

(87) PCT Pub. No.: WO2022/128099
PCT Pub. Date: Jun. 23, 2022

(65) Prior Publication Data
US 2022/0402315 A1 Dec. 22, 2022

(51) Int. Cl.
*B60C 23/10* (2006.01)
*B60C 23/04* (2006.01)
*B60C 23/16* (2006.01)
*B60C 29/06* (2006.01)
*B60S 9/10* (2006.01)

(52) U.S. Cl.
CPC ........ *B60C 29/064* (2013.01); *B60C 23/0416* (2013.01); *B60C 23/10* (2013.01); *B60C 23/16* (2013.01); *B60S 9/10* (2013.01)

(58) Field of Classification Search
CPC ....... B60C 29/064; B60C 23/10; B60C 23/16; B60S 9/10
See application file for complete search history.

(56) References Cited

U.S. PATENT DOCUMENTS

| | | | | |
|---|---|---|---|---|
| 2,579,048 A | * | 12/1951 | Paul ................. | B60C 23/00305 152/416 |
| 4,187,058 A | * | 2/1980 | Fish ....................... | F04B 35/04 D15/7 |
| 4,470,506 A | * | 9/1984 | Goodell ............ | B60C 23/00318 152/416 |

(Continued)

FOREIGN PATENT DOCUMENTS

| | | |
|---|---|---|
| DE | 3601103 A1 | 7/1987 |
| DE | 9106548 U1 | 7/1991 |

(Continued)

OTHER PUBLICATIONS

Translation of DE 3601103, Braunschlager, Published in German Jul. 1987 (Year: 1987).*

*Primary Examiner* — Jason K Niesz
(74) *Attorney, Agent, or Firm* — Richard M. Goldberg

(57) ABSTRACT

A motor vehicle (10, 100) with a chassis (20, 120), a plurality of wheels (12, 14, 16, 18) with pneumatic tyres (14*a*) and an on-board compressed air system (40, 140) for supplying pneumatic operating devices of motor vehicle (10, 100), includes at least one brake circuit (44) and/or one air suspension system (46), an emergency system (60, 160) for temporary pressurisation of the tyres in the event of a flat tyre, including compressed air connections (62, 64, 66, 68; 162, 164, 166, 168) installed permanently on the motor vehicle, each one having a flexible compressed air hose (70) for connection with a tyre valve (14*b*) and may be stored entirely in the motor vehicle (10, 100) and extracted from it in the event of a flat tyre, and which is supplied by the on-board compressed air system (40, 140).

11 Claims, 4 Drawing Sheets

(56) References Cited

U.S. PATENT DOCUMENTS

| | | | |
|---|---|---|---|
| 5,730,177 A | 3/1998 | Kim | |
| 2007/0013537 A1* | 1/2007 | Jones | B60Q 1/52 |
| | | | 340/626 |
| 2008/0150473 A1* | 6/2008 | Wise | H02J 7/342 |
| | | | 417/313 |

FOREIGN PATENT DOCUMENTS

| | | |
|---|---|---|
| DE | 9109984 U1 | 10/1991 |
| DE | 4140704 A1 | 6/1993 |
| WO | 03/047890 A1 | 6/2003 |

\* cited by examiner

MOTOR VEHICLE

BACKGROUND OF THE INVENTION

The present invention relates to a motor vehicle according to the claims.

Motor vehicles of the type considered here conventionally comprise a chassis in which a plurality of wheels with pneumatic tyres are mounted. The pneumatic tyres of the wheels are provided with tyre valves via which the tyres are inflated. This is usually done via separate compressors of the type found in vehicle workshops or at petrol stations.

In addition, many motor vehicles, in particular commercial vehicles, are equipped with an on-board compressed air system set up to supply various pneumatic operating devices of the vehicle. These pneumatic operating devices include at least one brake circuit and/or air suspension system.

To enable provisional sealing and inflation of a tyre in the event of a flat tyre, many motor vehicles also carry an emergency kit containing a sealant for injection into the tyre and a mobile compressor unit for inflating the provisionally sealed tyre. Its handling is sometimes cumbersome, however, and the kit always has to be carried as a separate item in the vehicle. Since it is rarely used, it is generally stored in a remote spot, e.g. under the floor of the boot where it is not ready for immediate use in the event of an emergency. Moreover, it is not always guaranteed that the compressor will function when needed after a lengthy period of storage in the vehicle.

SUMMARY OF THE INVENTION

Hence it is a task of the present invention to provide means for remedying a flat tyre with simplified handling compared to the conventional emergency kits, without the aforementioned disadvantages, e.g. regarding the readiness for use of the source of compressed air for inflating the tyres.

This task is solved according to the invention by a motor vehicle with the features of claim 1.

The vehicle according to the invention comprises an integral emergency system for the temporary pressurisation of the tyres in case of a flat tyre. This emergency system comprises a plurality of compressed air connections permanently installed on the motor vehicle, each having a flexible compressed air hose, whose free end can be connected to a tyre valve. When not in use, i.e. during usual operation of the vehicle, this compressed air hose can be completely stowed inside the motor vehicle and can be pulled out of it in case of a problem, i.e. when the vehicle is stationary. Each compressed air connection is fed by the vehicle's on-board compressed air system.

This integral emergency system is characterised on the one hand in that the compressed air connection(s) can be installed on the motor vehicle in such a way that a wheel can be conveniently reached with each compressed air hose in the pulled-out state. Hence it is no longer necessary to always carry a separate compressor for emergencies, look for it amongst the vehicle accessories in case of a flat tyre and attach it to the wheel. Moreover, the compressed air source of the vehicle's own compressed air system, which is installed in the vehicle anyway, can be used to inflate the tyres.

Hence the emergency system according to the invention is integrated within the vehicle's own compressed air system and can share its compressed air circuit with other available compressed air circuits if need be, e.g. that of the brake circuit and/or the air suspension system. Hence the emergency system according to the invention may also be controlled by the vehicle's own control and input elements, which control the distribution of compressed air within the vehicle's on-board compressed air system and branch off the compressed air required to inflate the tyres via a suitable valve control, for example.

According to a preferred embodiment of the present invention, the emergency system comprises a plurality of compressed air connections which are distributed around the motor vehicle, with each compressed air connection being attributed to one of the wheels. The "attribution" of the respective compressed air connection to a wheel is intended to designate a spatial attribution, i.e. the corresponding compressed air connection is positioned on or near the relevant wheel on the vehicle. On the other hand, it is also an operative attribution such that the hose of this compressed air connection can reach the tyre valve of the wheel attributed to it, no matter what the position of the wheel. The distance of the compressed air hose from the degree and the length of the compressed air hose are to be suitably selected for this purpose.

The motor vehicle preferably comprises two front right and left wheels in the direction of travel and at least two rear right and left wheels, and the emergency system accordingly comprises four compressed air connections disposed on the motor vehicle at the positions corresponding to the respective wheels, at front right and left and rear right and left.

The compressed air connections further preferably comprise a storage compartment to receive the compressed air hose, which can be closed by a flap.

The storage compartment is preferably provided in the underbody of the motor vehicle and opens downwards. This avoids visual impairment of the vehicle body.

According to an alternative embodiment, the storage compartment is provided in a fender of the motor vehicle and opens sidewards. In this case, the flap of the storage compartment visually hides the compressed air connection.

The compressed air hose is preferably a hose which retracts automatically into the storage compartment. This facilitates stowing of the compressed air hose after use.

According to another embodiment, the compressed air hose is a spiral hose. It can be spirally or helically wound so that it can be elastically pulled out of the storage compartment, but automatically retracts into the storage compartment after use due to its restoring force.

BRIEF DESCRIPTION OF THE DRAWINGS

A preferred embodiment of the present invention will be described in more detail below with reference to the drawings, in which.

DETAILED DESCRIPTION

Figure 1:
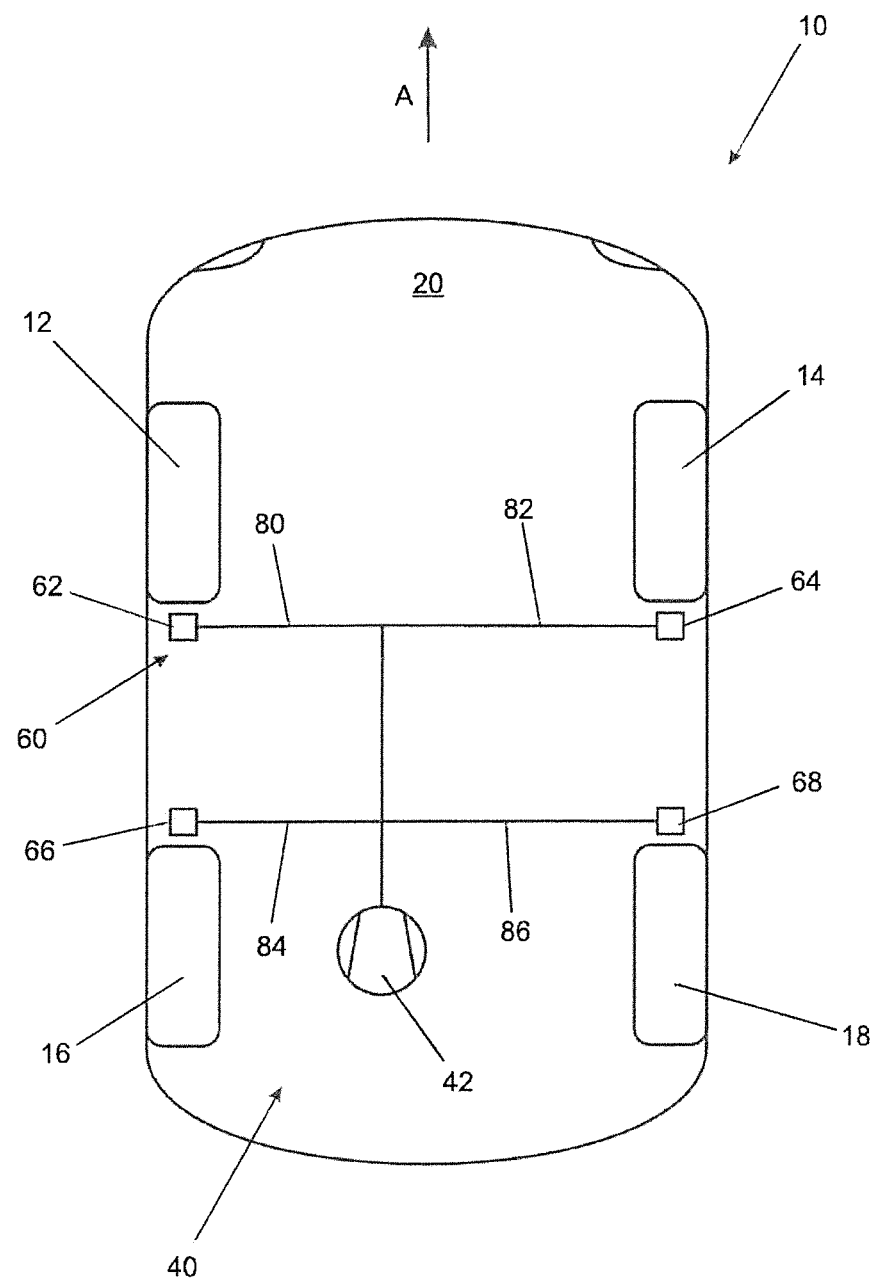
FIG. 1 is a diagrammatic view of the components of a first embodiment of the motor vehicle according to the invention.

FIG. 1 shows a diagrammatic plan view of a motor vehicle 10. It concerns an ordinary road vehicle with four wheels 12, 14, 16, 18 disposed relative to the direction of travel (indicated by an arrow A) at front right and left and at rear right and left on a chassis 20 not shown in detail of vehicle 10.

Wheels 12, 14, 16, 18 are fitted with pneumatic tyres. If one of the tyres loses air in the event of a puncture, either the wheel in question has to be replaced by a spare wheel or the tyre defect causing the loss of pressure must be temporarily remedied, and the tyre re-inflated.

For that scenario, vehicle 10 has an integral emergency system 60 for temporary pressurisation of the tyres of wheels 12, 14, 16, 18 in case of a puncture. This emergency system 60 comprises a plurality of compressed air connections installed permanently on vehicle 10. In the present embodiment, four compressed air connections 62, 64, 66, 68 are present with each compressed air connection 62, 64, 66, 68 being attributed to one of the four wheels 12, 14, 16, 18. In detail, a front left compressed air connection 62 is thus attributed to the left front wheel 12, a front right compressed air connection 64 is attributed to the right front wheel 14, a rear left compressed air connection 66 is attributed to the left rear wheel 16, and a rear right compressed air connection 68 is attributed to the right rear wheel 18. This spatial attribution is selected in such a way that the compressed air connection 62, 64, 66, 68 attributed to wheel 12, 14, 16, 18 can fill the tyre of this wheel 12, 14, 16, 18 with compressed air in any position of rotation of wheel 12, 14, 16, 18. The exact configuration of compressed air connections 62, 64, 66, 68 is shown in the detailed view of FIG. 2.

Figure 2:
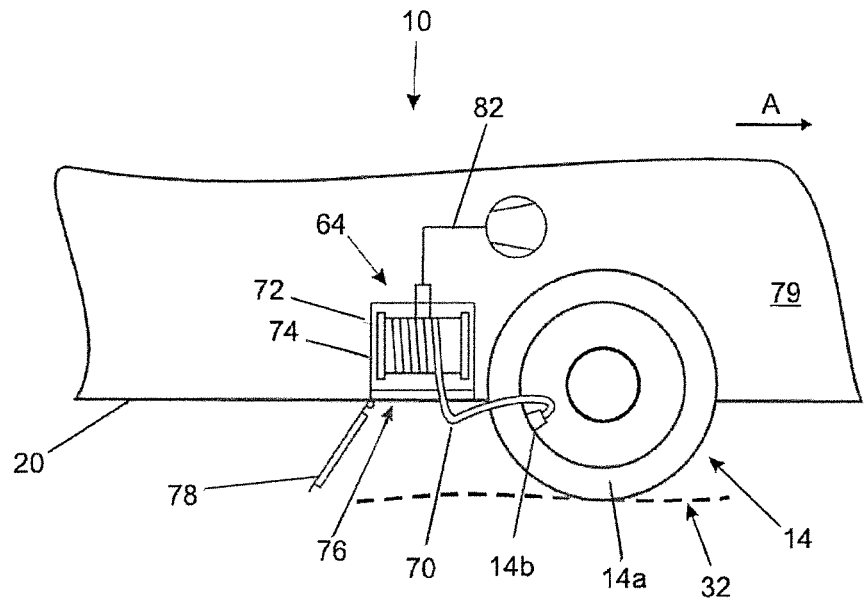
FIG. 2 is a partial side view of the motor vehicle of FIG. 1 in the region of the front right wheel.

FIG. 2 shows by way of example the compressed air connection 64, which is attributed to the right front wheel 14. Note that in the present embodiment, all four compressed air connections 62, 64, 66, 68 present are identical in design so that the following comments in relation to FIG. 2 also apply to the remaining compressed air connections 62, 66 and 68 which are not shown.

Compressed air connection 64 comprises a flexible compressed air hose 70 which, wound onto a reel 72, may be wound in a storage compartment 74 in the floor of motor vehicle 10 and when not in use is fully stowed in storage compartment 74 wound on this reel 72. Storage compartment 74 opens downwards, i.e. towards the ground 32 underneath vehicle 10. Its opening 76 may be closed by a pivoting flap 78.

To inflate the tyre 14a of wheel 14 in case of a puncture, flap 78 is opened and the flexible compressed air hose 70 is pulled downward out of storage compartment 74 through opening 76. The reel 72 may be set up such that it automatically retracts the compressed air hose 70 and the compressed air hose 70 is extracted against a rotational pre-tensioning of reel 72. The length of compressed air hose 70 is sufficient to be able to reach the tyre valve 14b of tyre 14a in any position of rotation of wheel 14. The free end of compressed air hose 70 may be connected to tyre valve 14b.

Tyre 14a is then inflated via compressed air connection 64. For this purpose, compressed air connection 64, and also the other compressed air connections 62, 66 and 68, is fed by the vehicle's own compressed air system provided to supply various pneumatic operating device of motor vehicle 10. This on-board compressed air system 40 is shown simplified in FIG. 1 and in more detail in the diagram in FIG. 3. In the present embodiment, the motor vehicle comprises a pneumatic brake circuit 44 and a pneumatic air suspension system 46. They are shown only diagrammatically in FIG. 3 on the basis of their compressed air volumes. Hence compressor 42 serves according to the invention not only to supply the vehicle's conventional pneumatic operating devices such as the brake circuit 44 and the air suspension system 46, but also the emergency system 60 according to the invention and its compressed air connections 62, 64, 66, 68.

Figure 3:
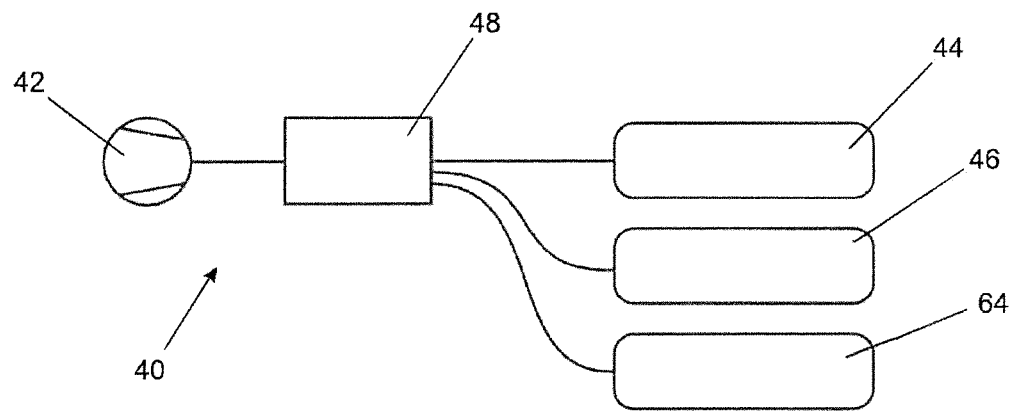
FIG. 3 is a diagrammatic representation of a compressed air system for supplying various operating devices of the motor vehicle of FIGS. 1 and 2, and of the integral emergency system according to the invention.

FIG. 1 shows only the compressor 42, which is connected to compressed air connections 62, 64, 66, 68 via individual compressed air lines 80, 82, 84, 86 branching off from a main line. In an actual embodiment, compressor 42 will in fact be connected with compressed air connections 62, 64, 66, 68 via corresponding distribution valves, pressure reducers and the like, which are part of the on-board compressed air system 40. In FIG. 3 this is shown by way of example with reference to a distributor valve 48 which distributes the compressed air generated by compressor 42 to one or more operating devices as required, i.e. brake circuit 44, the air suspension system 46 and/or the compressed air connection 64 (representing all compressed air connections 62, 64, 66, 68). A position of distributor valve 48 in which compressor 42 is not operated and compressed air is instead directed from a compressed air reservoir of brake circuit 44 or from an air suspension system 46 to one or more of compressed air connections 62, 64, 66, 68 is also conceivable. Excess pressure in one of the pressure reservoirs can thus be used to operate another pneumatic operating device. For this purpose, cross connections for exchanging compressed air between brake circuit 44, air suspension system 46 and compressed air connections 62, 64, 66, 68 can also be provided, which can be opened or closed. For example, solely a brake circuit 44 or an air suspension system 46 may be supplied with compressed air from compressor 42, and a compressed air connection 62 is operated solely from this reservoir of compressed air.

Various options may be envisaged for the individual operation of compressed air connections 62, 64, 66, 68. Compressed air connections 62, 64, 66, 68 may be individually operated from the driver's seat of motor vehicle 10, for example, i.e. from the dashboard (not shown). Corresponding input devices such as switches or such like serve to operate compressed air connections 62, 64, 66, 68. Compressed air connections 62, 64, 66, 68 may be connected via corresponding control lines with the control station at the driver's seat, e.g. via the data bus (e.g. CAN) of motor vehicle 10. A control computer integrated in the vehicle's electronic system may also decide which compressed air source is used to supply compressed air connections 62, 64, 66, 68, i.e. from the compressor 42 directly or via the compressed air reservoir of another pneumatic operating device such as the brake circuit 44 or the air suspension system 46, as illustrated above.

Departing from the embodiment shown in FIG. 2, the storage compartment 74 for accommodating the respective compressed air hose 70 may also be fitted to motor vehicle 10 at the side, i.e. in the fender 79 of the motor vehicle, in which a lateral flap is provided to open and close storage compartment 74. This facilitates access to the compressed air hose 70. Being covered by flap 78, the visual impairment to the appearance of motor vehicle 10 is only minimal.

Figure 4:
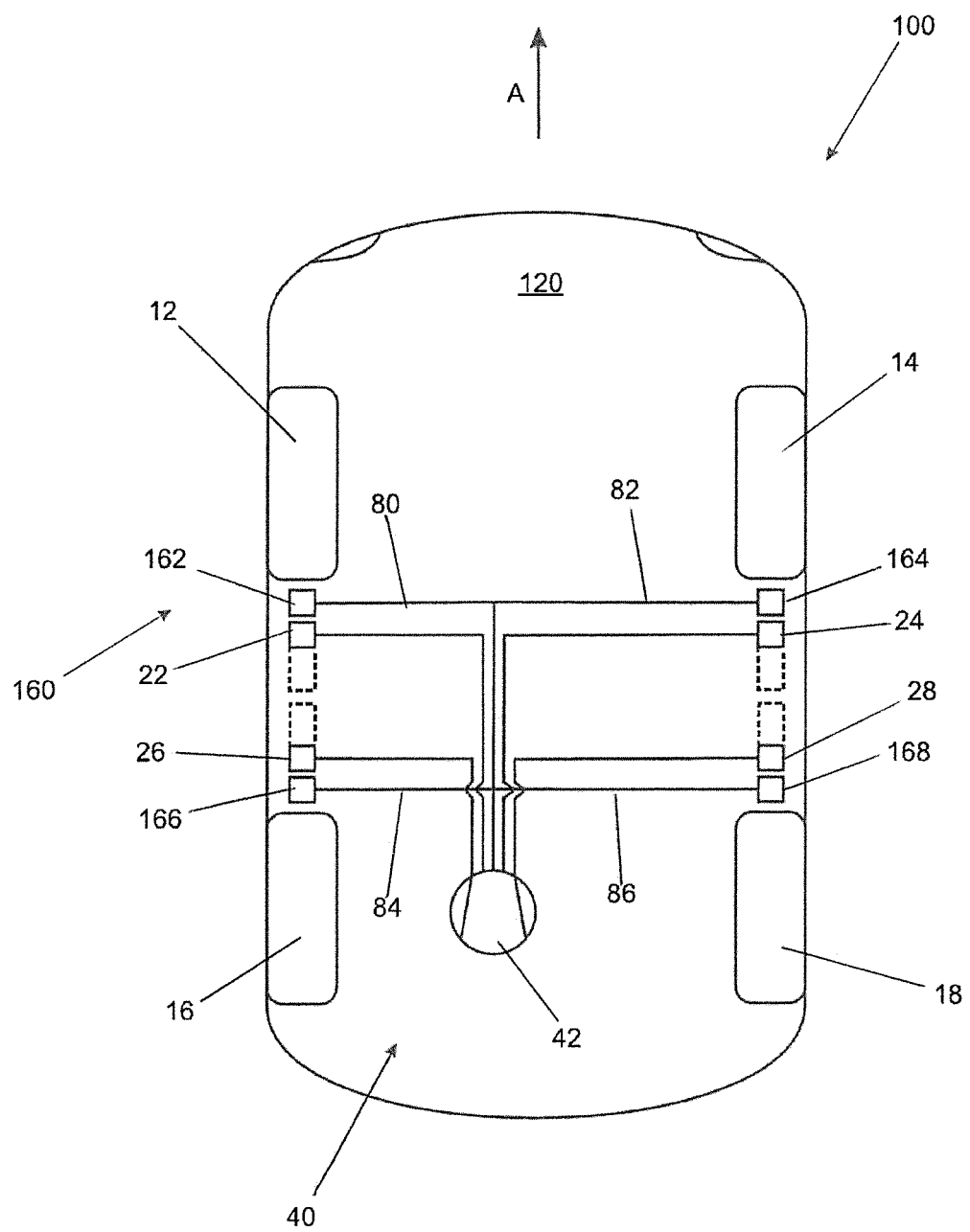
FIG. 4 is a diagrammatic representation of the components of a second embodiment of the motor vehicle according to the invention.

FIG. 4 shows a diagrammatic plan view of a motor vehicle 100, similar to the motor vehicle 10 in FIG. 1. In particular, motor vehicle 100 also has wheels 12, 14, 16, 18 as per the arrangement shown in FIG. 1, disposed on the chassis 120 of motor vehicle 100. This motor vehicle 100 also comprises an emergency system 160 for the temporary pressurisation of the tyres of wheels 12, 14, 16, 18 which is identical to the emergency system 60 of motor vehicle 10, as described above. Accordingly, four compressed air connections 162, 164, 166, 168 are also provided, with each compressed air connection 162, 164, 166, 168 being attributed to a wheel 12, 14, 16, 18. This attribution corresponds to the embodiment in FIG. 1. This emergency system 160 is also supplied by the on-board compressed air system, i.e. by its compressor or the compressed air reservoir of individual pneumatic operating devices of motor vehicle 10.

Figure 5:
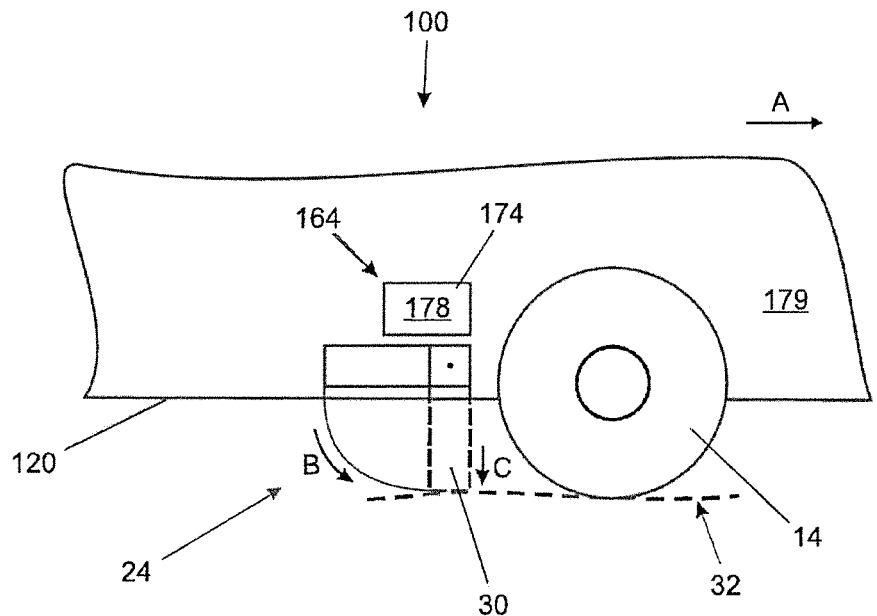
FIG. 5 is a partial side view of the motor vehicle of FIG. 4 in the region of the front right wheel.

In addition to each compressed air connection 162, 164, 166, 168, a pneumatic jack 22, 24, 26, 28 is attributed to each wheel 12, 14, 16, 18, and is part of the present emergency system 160. Each car jack 22, 24, 26, 28 is integrated in the chassis 120 and comprises a support which can be extracted downward from chassis 120 toward the ground 32, which bears the load of the wheel 12, 14, 16, 18 attributed to it. Pressing the support against the ground 32 lifts the chassis 120 and the entire motor vehicle 100 with it. This is shown in FIG. 5 by way of example. The support 30 of the jack 24 shown there can be folded down out of chassis 120 (arrow B) and partially extended downward (arrow C). In this way, support 30 can be pressed against the ground 32, thereby lifting chassis 120 together with motor vehicle 100. When not in use, jack 24 is completely refracted into the floor of motor vehicle 100 such that it is not visible from the side of motor vehicle 100.

The compressed air connection 164 attributed to the front right wheel 14 and jack 24, comprises a storage compartment 174 provided directly above jack 24 in the fender 179 of motor vehicle 100 which is opened at the side and closed by a flap 178. The compressed air hose of compressed air connection 164 is stored inside. Details of this compressed air hose and its function will not be described here and are identical to the compressed air hose 70 of FIG. 2. The arrangement shown in FIG. 5 also serves as an example for the other compressed air connections 162, 166 and 168.

Figure 6:
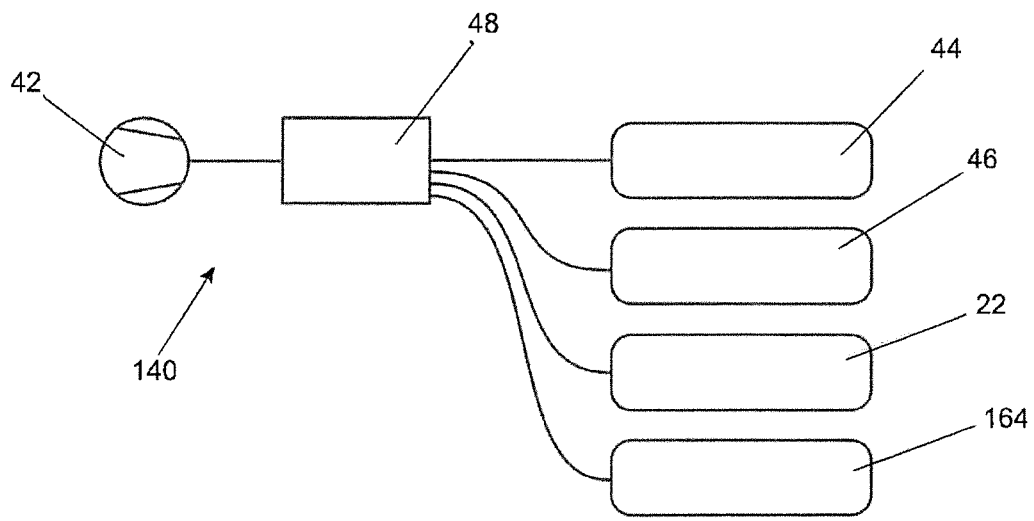
FIG. 6 is a diagrammatic representation of a compressed air system for supplying various operating devices of the motor vehicle of FIGS. 4 and 5.

Jacks 22, 24, 26, 28 of the emergency system 160 shown here are also supplied by the on-board compressed air system 140 as shown diagrammatically in FIG. 6. This compressed air system 140 corresponds to an expanded version of the compressed air system 40 of FIG. 3, with a compressed air reservoir of jack 22 shown in addition, representing the compressed air reservoir of all jacks 22, 24, 26, 28, or they may also have a common compressed air reservoir. Like the above embodiment, compressed air connection 164 (representing all compressed air connections 162, 164, 166, 168) may be supplied with compressed air by a compressor 42 via a distributor valve 48, like the brake circuit 44 and the air suspension system 46. Additionally, however, jack 22 (representing all jacks 22, 24, 26, 28) may be supplied with compressed air from compressor 42 or, as desired from the compressed air reservoirs of the other operating devices, i.e. brake circuit 44, the air suspension system 46 or the compressed air connection 164, depending on the available quantities of compressed air. Hence compressed air may be exchanged between the reservoirs of compressed air as required. In the same way as shown in FIG. 3, cross connections between the compressed air reservoirs may also be provided independently of distributor valve 48. This latter may be a multiport valve or may be represented by a plurality of combined valves. In this case too, only a compressed air reservoir of the brake circuit 44, the air suspension system 46 or the compressed air connection 164 may be fed by compressor 42 and jack 22 is operated solely from this reserve of compressed air.

Like compressed air connections 162, 164, 166, 168, input devices for controlling the jack(s) 22, 24, 26, 28 may be provided at a control station, for example on the dashboard by the driver's seat of the motor vehicle. Combined activation of jacks 22, 24, 26, 28 and compressed air devices 162, 164, 166, 168 is also conceivable such that on activation of respective jack 22, 24, 26, 28, the latter is initially extended and the corresponding compressed air connection 164 is supplied with compressed air at the same time or immediately after.

What is claimed is:

1. Motor vehicle comprising:
a chassis,
a plurality of wheels with pneumatic tires provided with tire valves for pressurization with compressed air,
an on-board compressed air system set up to supply pressurized air from at least one pneumatic operating device of the motor vehicle to at least one of the following:
a brake circuit and
an air suspension system,
an emergency system for temporary pressurization of the tires in the event of a flat tire, comprising a plurality of compressed air connections permanently installed on the motor vehicle, of which each one comprises a flexible compressed air hose having a free end which is adapted to be connected to a tire valve and when not in use is adapted to be completely stored in the motor vehicle and extracted therefrom in the event of a flat tire, and which is supplied with pressurized air by the on-board compressed air system,
wherein the emergency system also comprises a plurality of pneumatically operated jacks, with each jack being integrated in the chassis, and each jack comprises a support which is adapted to be extended from the chassis towards a ground surface and is driven by the on-board compressed air system.

2. Motor vehicle according to claim 1, further including a driver's seat and a control station for operating devices of the motor vehicle, disposed at the driver's seat, which comprises input devices for controlling the jacks.

3. Motor vehicle according to claim 1, wherein the plurality of compressed air connections are distributed around the motor vehicle with each compressed air connection being attributed to one of the wheels.

4. Motor vehicle according to claim 3, wherein:
the motor vehicle comprises two front right and left wheels in the direction of travel and two rear right and left wheels, and
the emergency system accordingly comprises four compressed air connections disposed on the motor vehicle at the positions corresponding to the respective wheels at front right and left and rear right and left.

5. Motor vehicle according to claim 1, wherein each jack is attributed to one of the wheels.

6. Motor vehicle according to claim 5, wherein each jack, when not in use, is completely retracted into a floor of the motor vehicle in a way that is invisible, at least from a side of the motor vehicle.

7. Motor vehicle according to claim 1, wherein the compressed air connections each comprise a storage compartment to accommodate the compressed air hose, which is adapted to be closed by a flap.

8. Motor vehicle according to claim 7, wherein the storage compartment is provided in a floor of the motor vehicle and is opened downwards.

9. Motor vehicle according to claim 7, wherein the storage compartment is provided in a fender of the motor vehicle and is opened sidewards.

10. Motor vehicle according to claim 7, wherein the compressed air hose is a hose which self-retracts into the storage compartment.

11. Motor vehicle according to claim 7, wherein the compressed air hose is a spiral hose.

\* \* \* \* \*